3,262,979
PREPARATION OF COMPLEX LITHIUM VINYLTRIETHYLBORON
James M. Riddle, Baton Rouge, La., assignor to Ethyl Corporation, New York, N.Y., a corporation of Virginia
No drawing. Filed June 22, 1964, Ser. No. 378,486
2 Claims. (Cl. 260—606.5)

This invention relates to a novel compound and to a process for its production. More particularly, it relates to lithium vinyltriethylboron and to a novel process by which this material can be synthesized.

Lithium vinyltriethylboron has the formula

$$\text{LiB}(CH=CH_2)(C_2H_5)_3$$

It generally exists as an off-white semi-solid or waxy material, which has appreciable solubility in certain inert, anhydrous organic solvents such as ethers, to which it imparts a yellow coloration. On exposure to water or other hydroxylated materials, lithium vinyltriethylboron evolves a mixture of ethane and ethylene and is therefore useful as a convenient source of these hydrocarbons. It is also a useful intermediate which undergoes reaction with aluminum hydride to form lithium vinyl aluminum trihydride, a powerful reducing agent. Furthermore, the complexed vinyllithium is a useful reactant for the production of vinyl derivatives of other metals.

To prepare this novel compound, gaseous vinyl chloride is introduced into a suspension of lithium metal in a solution of triethylborane in a suitable ether such as tetrahydrofuran. This reaction is preferably carried out under ambient temperature and pressure conditions (e.g., room temperature, atmospheric pressure) and under anhydrous conditions. Reaction proceeds readily, as evidenced by vigorous absorption of the vinyl chloride. The organic phase is separated from the excess, unreacted lithium and is then evaporated (preferably at reduced pressure and room temperature) to yield the product of this invention in an essentially pure state.

The relative proportions of triethylborane and vinyl chloride are not critical, although the presence of an excess of one reactant favors completeness of the reaction. For this reason an excess is desirable and, since vinyl chloride is both cheaper and easier to handle than triethylborane, an excess of the vinyl chloride reactant is preferred.

In an actual experiment utilizing the foregoing procedure in which vinyl chloride was bubbled into 1.4 grams of lithium suspended in a solution of 9.8 grams of triethylborane in 200 cc. of tetrahydrofuran at 45° C., considerable halide was absorbed by the mixture before it began to escape from the reactor. After stirring overnight at room temperature, with no flow of vinyl chloride through the mixture, the solution was deep yellow in color. The unreacted lithium was removed by filtration. Evaporation of the remainder of the filtrate left an off-white, semi-solid material which, on analysis, was found to correspond to the formula $\text{LiB}(CH=CH_2)(C_2H_5)_3$.

Methods for preparing the reactants used in the process of this invention are reported in the literature. Thus, vinyl chloride is readily prepared by the thermal dehydrochlorination of ethylene dichloride (Fieser and Fieser, "Advanced Organic Chemistry," New York, Reinhold Publishing Co., 1961, page 340), and triethylborane by the reaction of methyl borate with an ether solution of ethylmagnesium bromide (R. Koster, Annalen 1958, 618, 31).

What is claimed is:
1. Lithium vinyltriethylboron.
2. A process for the production of lithium vinyltriethylboron which comprises introducing gaseous vinyl chloride into a suspension of lithium metal in a solution of triethylborane in tetrahydrofuran and isolating the lithium vinyltriethylboron from the resultant system.

No references cited.

TOBIAS E. LEVOW, *Primary Examiner.*

CARL D. QUARFORTH, *Examiner.*

L. A. SEBASTIAN, W. F. BELLAMY,
*Assistant Examiners.*